(12) United States Patent
Tartaglia

(10) Patent No.: US 12,546,478 B2
(45) Date of Patent: Feb. 10, 2026

(54) RADIANT HEATER

(71) Applicant: Inforesight Consumer Products, Inc., Mississauga (CA)

(72) Inventor: Brandon Tartaglia, Mississauga (CA)

( * ) Notice: Subject to any disclaimer, the term of this patent is extended or adjusted under 35 U.S.C. 154(b) by 0 days.

(21) Appl. No.: 17/592,589

(22) Filed: Feb. 4, 2022

(65) Prior Publication Data

US 2022/0252272 A1    Aug. 11, 2022

Related U.S. Application Data

(60) Provisional application No. 63/146,040, filed on Feb. 5, 2021.

(51) Int. Cl.
| | |
|---|---|
| *F24C 7/04* | (2021.01) |
| *F24C 7/06* | (2006.01) |
| *F24C 15/22* | (2006.01) |
| *F24C 15/30* | (2006.01) |
| *H05B 3/00* | (2006.01) |

(52) U.S. Cl.
CPC ............. *F24C 7/043* (2013.01); *F24C 7/065* (2013.01); *F24C 15/22* (2013.01); *F24C 15/30* (2013.01); *H05B 3/008* (2013.01); *H05B 2203/032* (2013.01)

(58) Field of Classification Search
CPC .......... F24C 15/22; F24C 15/30; F24C 7/043; F24C 7/065; H05B 3/008; H05B 2203/032
USPC ......... 219/385–481, 538–553; 392/375–378, 392/420–429, 495–503
See application file for complete search history.

(56) References Cited

U.S. PATENT DOCUMENTS

| | | | | |
|---|---|---|---|---|
| 1,416,964 A | * | 5/1922 | Moreton | F24C 7/065 392/440 |
| 1,418,671 A | * | 6/1922 | Patterson | F24C 7/065 219/548 |
| 1,431,993 A | * | 10/1922 | Strunk | F24C 7/065 392/426 |
| 1,484,156 A | * | 2/1924 | Phelan | F24C 7/065 200/220 |
| 1,514,228 A | * | 11/1924 | Price | F24C 7/065 392/426 |
| 1,526,352 A | * | 2/1925 | Lightfoot | F24C 7/065 392/429 |
| 1,553,392 A | * | 9/1925 | Orange | F24C 7/065 219/520 |
| 1,666,831 A | * | 4/1928 | Pandolfo | F24C 7/065 219/460.1 |
| 1,671,378 A | * | 5/1928 | Pitt | F24C 7/065 219/536 |
| 1,750,492 A | * | 3/1930 | Ralston | F24C 7/065 392/426 |
| 1,767,816 A | * | 6/1930 | Shaw | F24C 7/065 219/541 |

(Continued)

*Primary Examiner* — Eric S Stapleton

(57) ABSTRACT

A body defines a void and an aperture and has a reflective surface, the void communicating with the aperture and the reflective surface presenting towards the aperture. A structure, adapted to produce infrared radiation, is positioned in the void such that infrared radiation produced by the structure is directed to the aperture. An optical filter is positioned to at least substantially occlude the aperture, the filter being adapted for through passage of the infrared radiation directed to the aperture and further being adapted to restrict the through passage of visible light.

4 Claims, 13 Drawing Sheets

(56) References Cited

U.S. PATENT DOCUMENTS

| | | | | |
|---|---|---|---|---|
| 1,785,413 A * | 12/1930 | Hicks | F24C 7/065 | 392/429 |
| 1,816,660 A * | 7/1931 | Shaw | F24C 7/065 | 219/541 |
| 1,868,411 A * | 7/1932 | De Ferranti | F24C 7/065 | 219/553 |
| 2,073,582 A * | 3/1937 | Morse | F24C 7/065 | 392/427 |
| 2,256,049 A * | 9/1941 | Gallup | F24C 7/065 | 392/355 |
| 2,277,151 A * | 3/1942 | Schoonmaker | F24H 3/0417 | 392/366 |
| 2,336,816 A * | 12/1943 | Thompson | F24C 3/042 | 431/100 |
| 2,410,211 A * | 10/1946 | Gough | F24H 3/0417 | 392/376 |
| 2,467,479 A * | 4/1949 | Huek | F24C 7/065 | 392/408 |
| 2,512,061 A * | 6/1950 | Huck | F24C 7/065 | 392/408 |
| 2,523,787 A * | 9/1950 | Spooner, Jr. | F24H 3/0417 | D23/328 |
| 2,612,591 A * | 9/1952 | Mcfarland | F24H 3/0417 | 392/440 |
| 2,748,247 A * | 5/1956 | Kozbelt | F24C 7/065 | 219/541 |
| 2,859,368 A * | 11/1958 | Biggs | H01K 7/00 | 313/273 |
| 2,897,337 A * | 7/1959 | Schiff | F24C 7/043 | 392/408 |
| 2,984,728 A * | 5/1961 | Murphy | F24C 7/043 | 392/363 |
| 3,065,327 A * | 11/1962 | Coultrip | F24C 15/102 | 126/214 R |
| 3,075,064 A * | 1/1963 | Bondonio | F24C 7/065 | 392/440 |
| 3,539,770 A * | 11/1970 | Wallace | F24C 7/065 | 219/460.1 |
| 3,546,427 A * | 12/1970 | Farrell, Jr. | F21V 33/0088 | 250/493.1 |
| 3,637,981 A * | 1/1972 | Swimmer | F24C 7/065 | 392/376 |
| 3,862,397 A * | 1/1975 | Anderson | C30B 25/10 | 118/724 |
| 5,381,509 A * | 1/1995 | Mills | F24C 7/105 | 392/376 |
| 5,568,586 A * | 10/1996 | Junkel | F24C 7/08 | 392/376 |
| 5,652,826 A * | 7/1997 | Mills | F24H 3/0417 | 392/360 |
| 5,761,377 A * | 6/1998 | Wolfe | F24H 3/0417 | 392/375 |
| 5,790,752 A * | 8/1998 | Anglin | H05B 1/0244 | 392/419 |
| 7,047,662 B2 * | 5/2006 | Ihme | B41F 23/0486 | 34/273 |
| 2001/0019661 A1* | 9/2001 | Choi | F24C 7/065 | 392/376 |
| 2006/0018640 A1* | 1/2006 | Hinesley | H05B 3/008 | 392/420 |
| 2010/0163547 A1* | 7/2010 | Wang | H05B 3/145 | 219/553 |
| 2010/0170890 A1* | 7/2010 | Liu | H05B 3/145 | 219/553 |
| 2011/0024410 A1* | 2/2011 | Liu | H05B 3/265 | 219/553 |
| 2012/0206050 A1* | 8/2012 | Spero | F21S 4/28 | 315/152 |
| 2019/0195500 A1* | 6/2019 | Tseng | F24C 3/082 | |
| 2019/0195501 A1* | 6/2019 | Tseng | A21B 1/02 | |
| 2019/0195502 A1* | 6/2019 | Tseng | F24C 3/004 | |
| 2019/0195506 A1* | 6/2019 | Tseng | F24C 3/047 | |

\* cited by examiner

RADIANT HEATER

CROSS-REFERENCE TO RELATED APPLICATIONS

This application claims under 35 U.S.C. 119(e), the benefit of U.S. Provisional Application Ser. No. 63/146,040, filed Feb. 5, 2021, incorporated herein by reference.

FIELD

The invention relates to the field of radiant heaters.

BACKGROUND

Known relatively durable and relatively reliable electric radiant heaters are relatively expensive and/or relatively low-powered.

SUMMARY OF THE INVENTION

A heater forms one aspect of the invention. The heater comprises:
  a body shaped in the manner of an inverted-bowl;
  an emitter arrangement disposed interiorly of the body, the arrangement being adapted to emit radiant energy; and
  a disc adapted to permit through passage of radiant energy, the disc being disposed within and in spaced relation to the body and beneath the emitter arrangement.

According to another aspect:
  the body can be annular and has a central axis;
  the disc can be orientated perpendicular to the central axis;
  the body can have a top portion that is orientated perpendicular to the central axis; and
  the emitter arrangement can be disposed in surrounding relation to the central axis and in a planar arrangement that is perpendicular to the central axis.

According to another aspect, the emitter arrangement can be defined by a plurality of linear emitters; and for each emitter, a parabolic reflector.

According to another aspect, a plurality of vents can be disposed in the top portion of the body.

According to another aspect, the plurality of emitters can be defined by three emitters.

According to another aspect, the heater can further comprise a heat resistant tubular core from which the disc is suspended and which extends therefrom to the support.

Advantages, features and characteristics of the present invention will become apparent upon review of the following detailed description with reference to the appended drawings, the latter being briefly described hereinafter.

DETAILED DESCRIPTION

Figure 1:
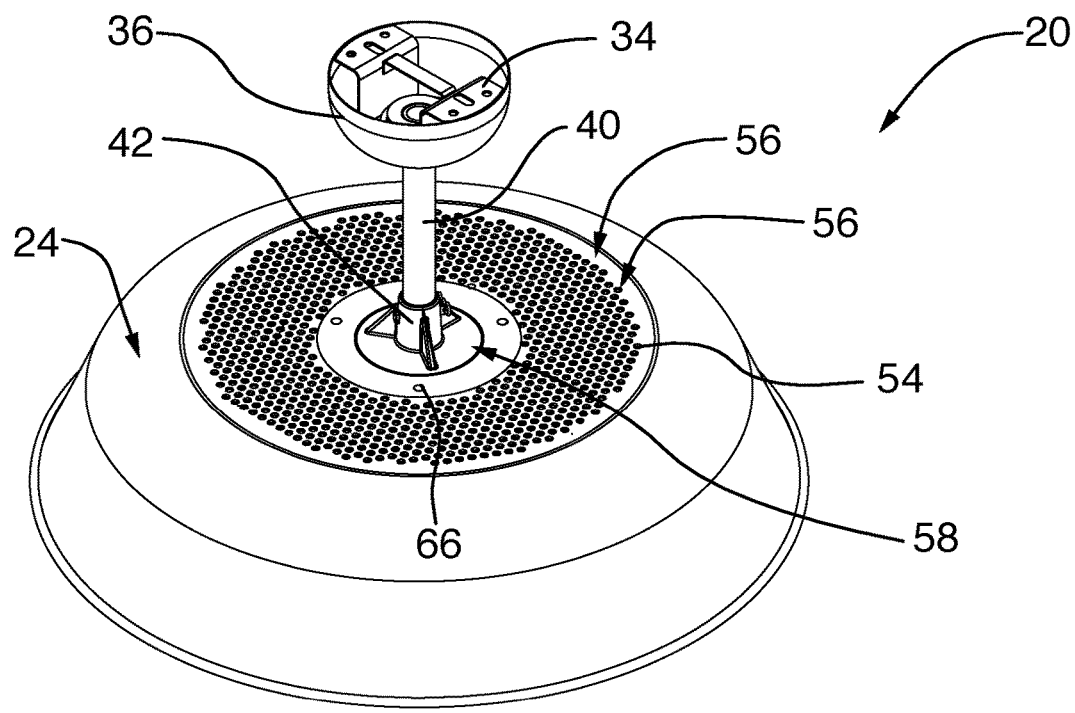
FIG. 1 is a top view of a heater according to a non-limiting example of the invention.
Figure 2:
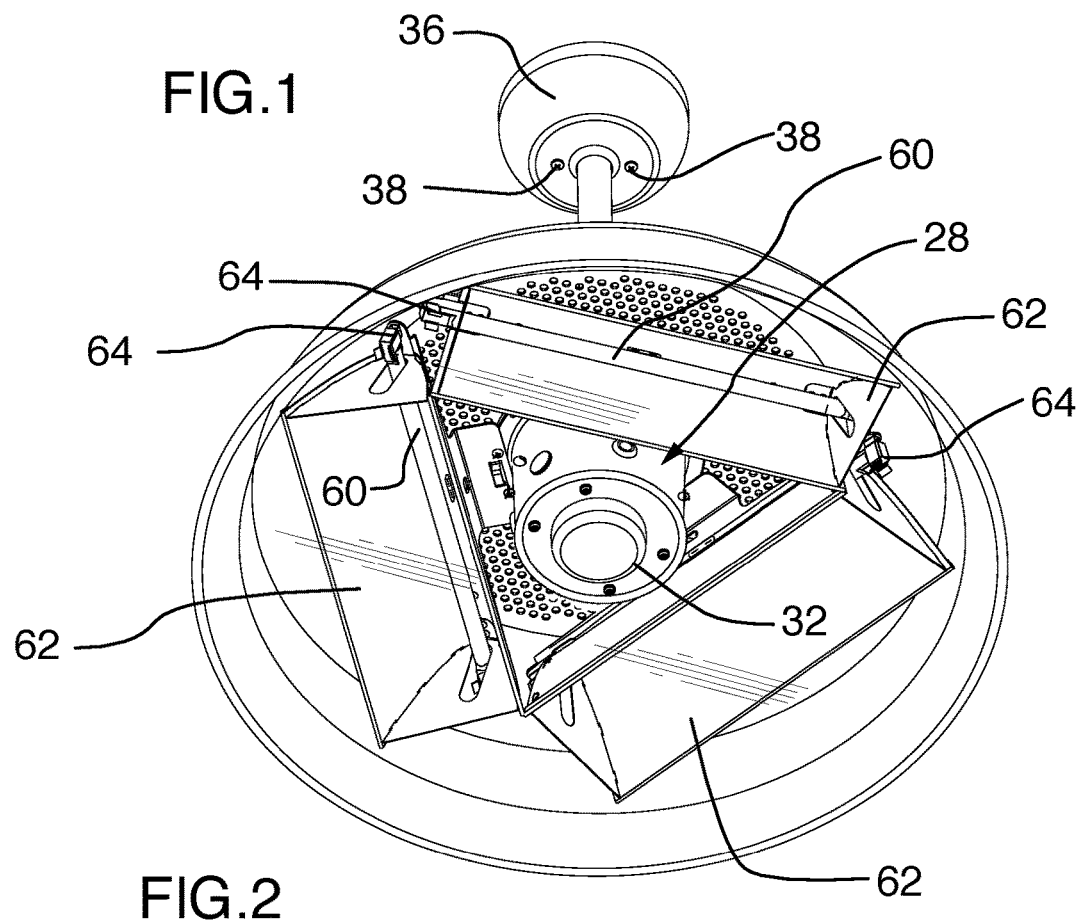
FIG. 2 is a bottom view of the heater of FIG. 1.
Figure 3:
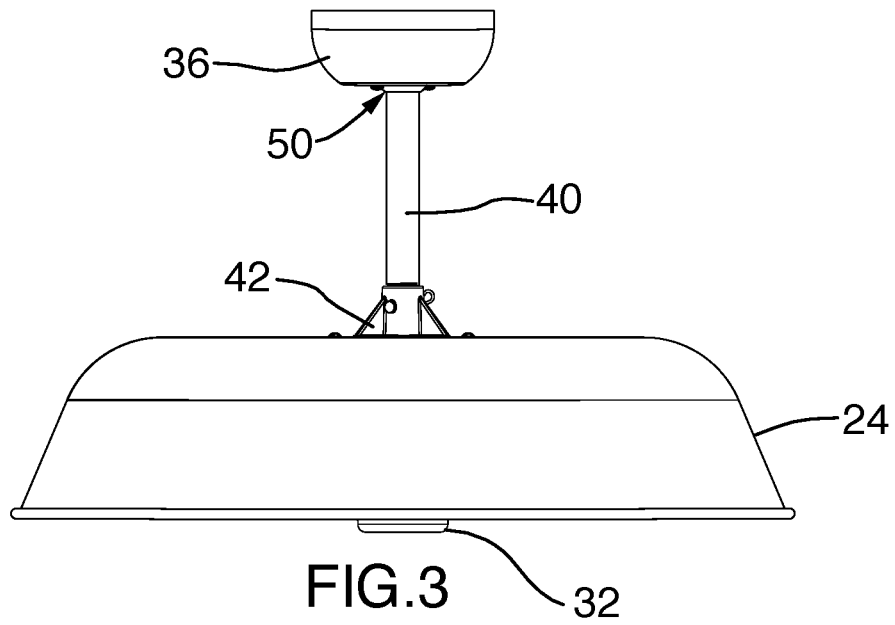
FIG. 3 is a side view of the heater of FIG. 1.
Figure 4:
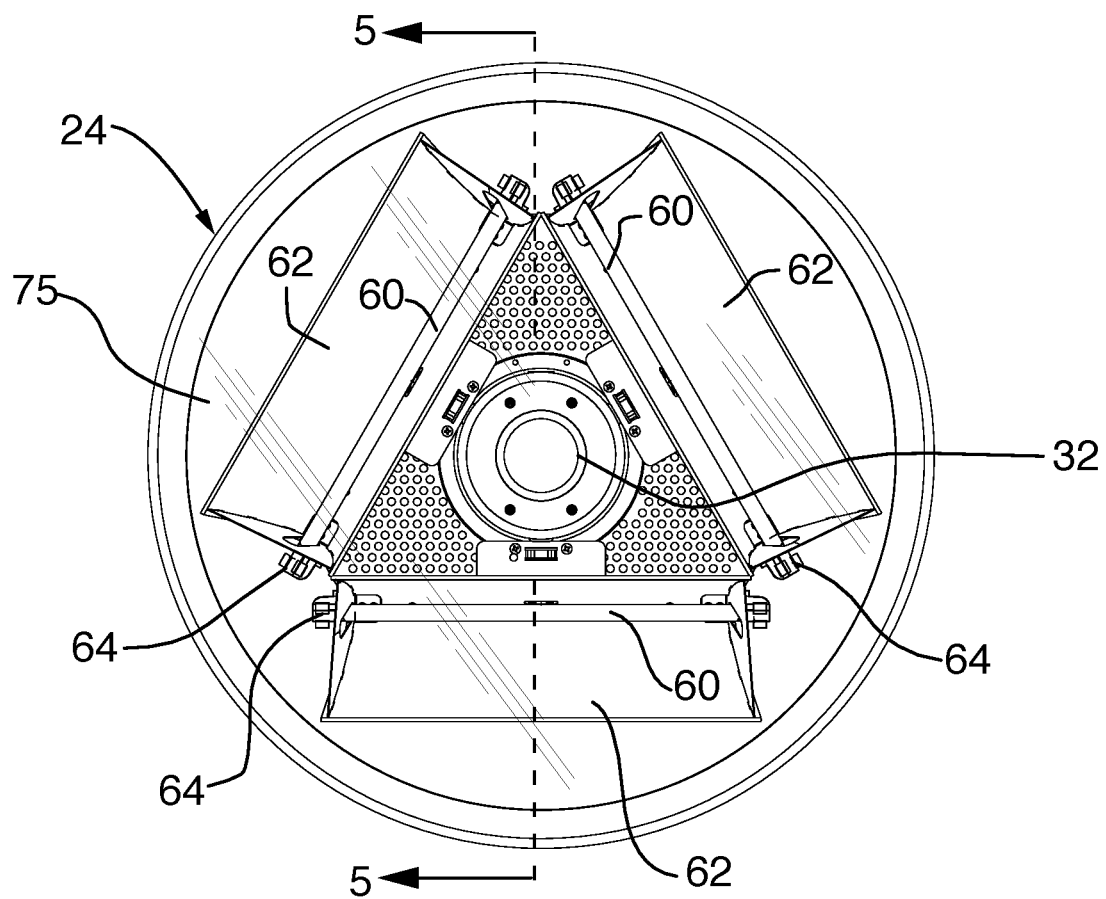
FIG. 4 is a bottom view of the heater of FIG. 1.
Figure 5:
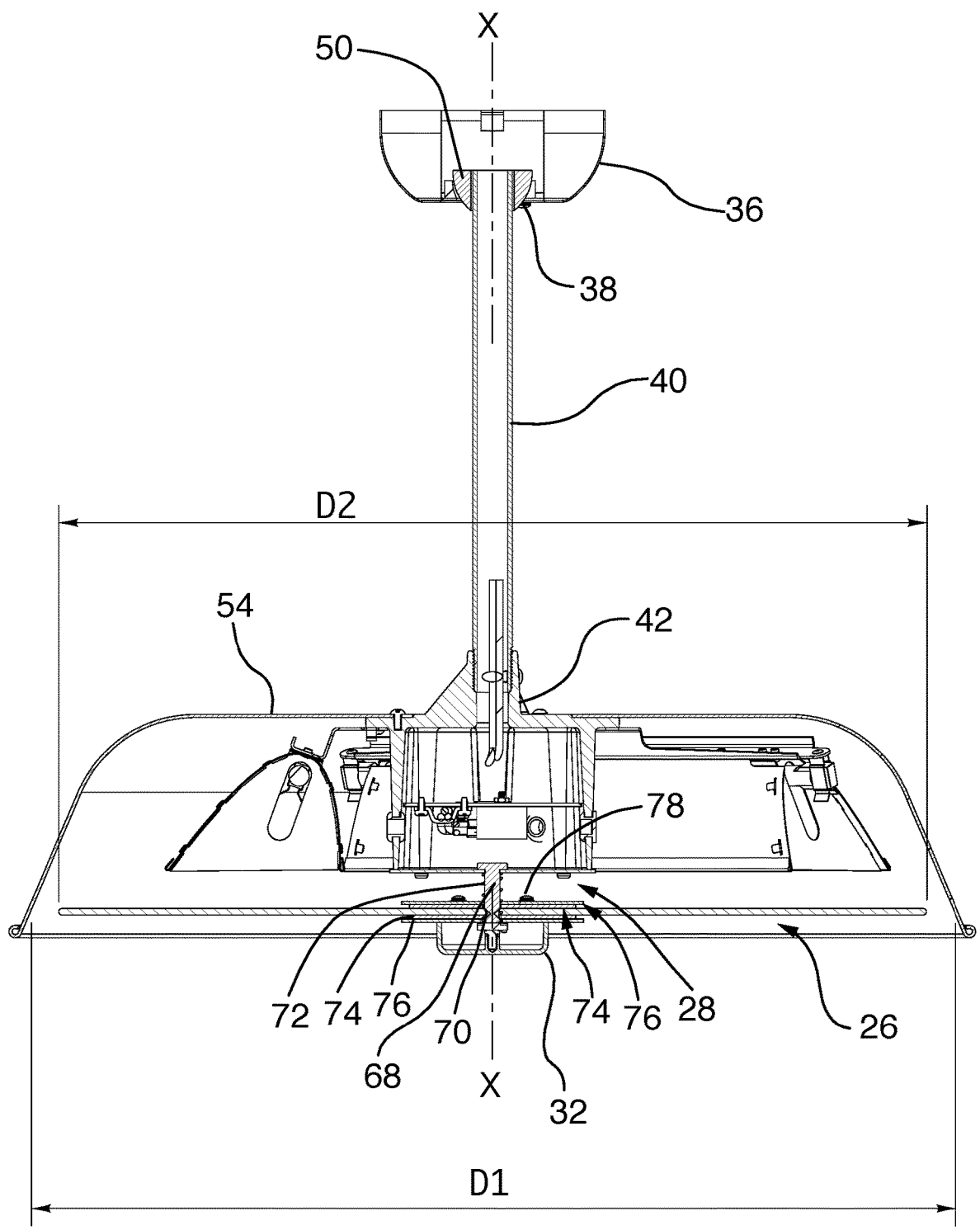
FIG. 5 is a view along section 5-5 of FIG. 4.
Figure 6:
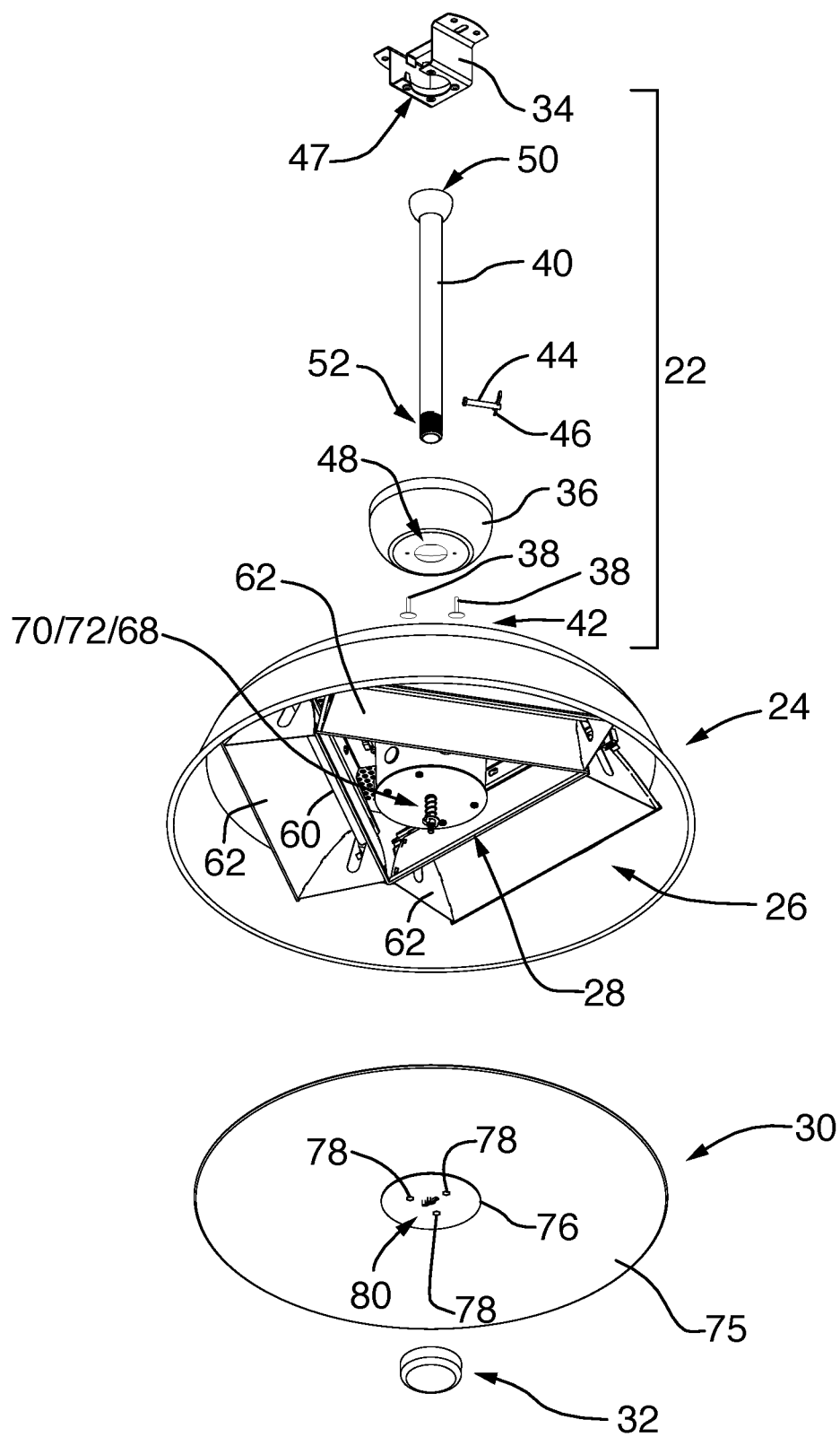
FIG. 6 is an exploded view of the heater of FIG. 1.

A heater 20 according to an embodiment of the invention is shown in FIGS. 1-5 and in exploded form in FIG. 6 and will be understood to include a mounting assembly 22; a body 24; a emitter arrangement 26, a core 28, a disc arrangement 30 and a cap 32.

The mounting assembly includes a bracket 34, a cover 36, a pair of cover screws 38, a support tube 40, a socket 42, a clevis pin 44 and a cotter pin 46. The bracket is adapted to be screwed to a receptacle box in a conventional manner and defines a receiver 47. The cover has an aperture 48 which communicates with the receiver and has the bracket disposed therein. The cover screws secure the cover to the bracket. The support tube has an enlarged end 50 nested in the receiver and extends through the aperture of the cover to a threaded end 52 and will be understood to have wires (not shown) for conducting electricity passing therethrough. The socket is threaded and is in threaded receipt of the support tube. The clevis pin passes through the socket and the tube and is secured in place by the cotter pin.

The body is annular, is in the shape of an inverted-bowl, has a central axis X-X and has a planar top portion 54 that: is orientated perpendicular to the central axis; defines a plurality of vents 56; and has a central void 58 through which the socket extends.

The emitter arrangement is: disposed interiorly of the body; adapted to emit radiant energy; disposed in surrounding relation to the central axis and in an planar arrangement that is perpendicular to the central axis; and defined by a plurality of linear emitters 60, namely, three 2000W linear emitters, and for each emitter, a parabolic reflector 62. The parabolic reflectors are disposed interiorly of the body. The emitters are disposed one each within the reflectors. Each emitter is a tungsten-quartz element using the halogen cycle, gold coated to reduce visible light output. A fixture 64 is provided for and captures each emitter.

The core is a heat resistant tubular structure which is secured to the cover by screws 66 and from which the socket extends and has a pintle 68 extending therefrom, the pintle terminating in an enlarged threaded end 70 and being surrounded by a spring 72. It will be understood that the pintle extends a distance such that, at the trailing edge of the enlarged end, the interior diameter D1 of the bowl is 780 mm. The core will be understood to have the reflectors and fixtures mounted thereto and to interiorly contain circuitry for driving the emitters. Electrical conductors, not shown, will be understood to extend from the core to the fixtures. Persons of ordinary skill are familiar with the circuitry for operating emitters and as such details are neither provided nor required.

The disc arrangement includes a pair of cushions 74 disposed in flanking relation to a disc 75 and a pair of mounting plates 76 disposed in flanking relation to the cushions and secured to one another by screws 78. The mounting plates define an elongate slot 80 through which the pintle extends, one of the plates capturing the spring against the core and the other of the plates being captured by the enlarged end of the pintle. The disc is high strength ceramic glass adapted to permit through passage of radiant energy, is adapted for use at elevated temperatures, is disposed within and in spaced relation to the body and beneath the emitter arrangement and is orientated perpendicular to the central axis. The diameter D2 of the disc shown is 740 mm.

The cap is threaded to the end of the pintle to conceal the pintle and the screws of the disc arrangement.

Assembly

It will be appreciated that the heater will typically be shipped with the mounting assembly, the body, the disc arrangement and the emitters packed separately. For installation, the threaded end of the tube will be fitted through the aperture in the cover, the conductors extending from the socket will be inserted through the tube, threaded end first, the tube will be threaded into the socket, the clevis will be passed through the socket and the tube and the cotter pin will be fitted into the clevis.

Installation

Installation involves:
securing the bracket to a receptacle box in a conventional manner
connecting the leads to power interiorly of the box in a conventional manner
positioning the enlarged end of the tube into the receiver
raising the cover to hide the bracket
securing the screws through the cover to the bracket to secure the cover in place
putting emitters into the fixtures
positioning the disc assembly such that the enlarged end of the pintle is aligned with the slot
pushing the disc assembly past the enlarged end to tension the spring
rotating the disc assembly such that the slot and enlarged end are no longer aligned
releasing the tension on the spring; and
threading the cap on the threaded end of the pintle In use:
the emitters produce high energy radiation that passes through the disc; and
air passes between the disc and the body, through the reflectors, around the emitters, and ultimately through the vents in the body, thereby cooling, inter alia, the emitters.

Surprisingly, notwithstanding its relatively small size and relatively low cost construction, the heater, when embodied with three emitters, each of 2000W, has proven relatively durable in use. Without intending to be bound by theory, the airflow pattern provided by the geometry selected may account for the durability, as the heater remains relatively cool in use.

CFD

Figure 15:
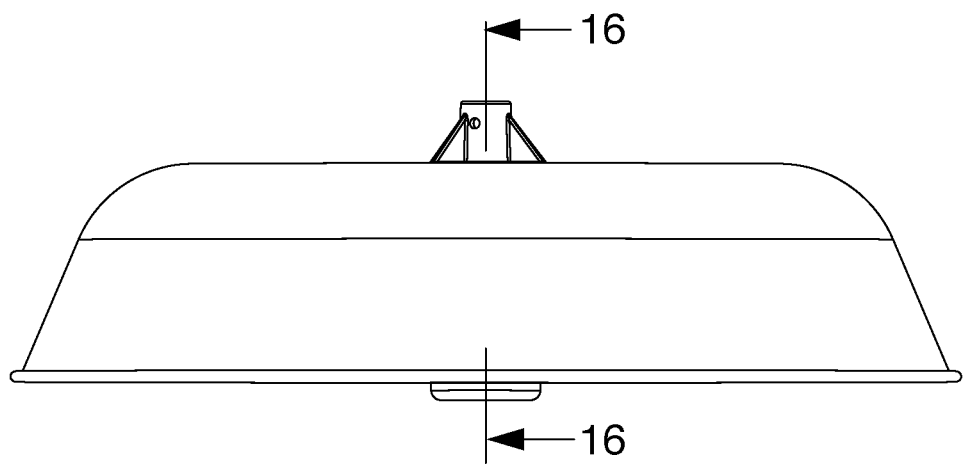
FIG. 15 is a side view of a model used for CFD analysis.
Figure 16:
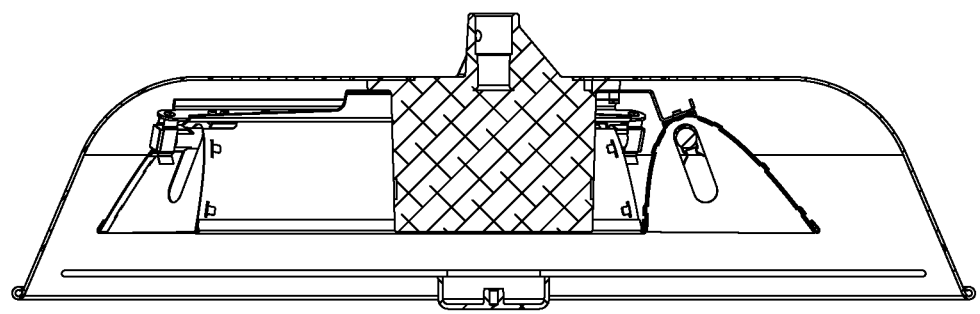
FIG. 16 is a view along 16-16 of FIG. 15.
Figure 17:
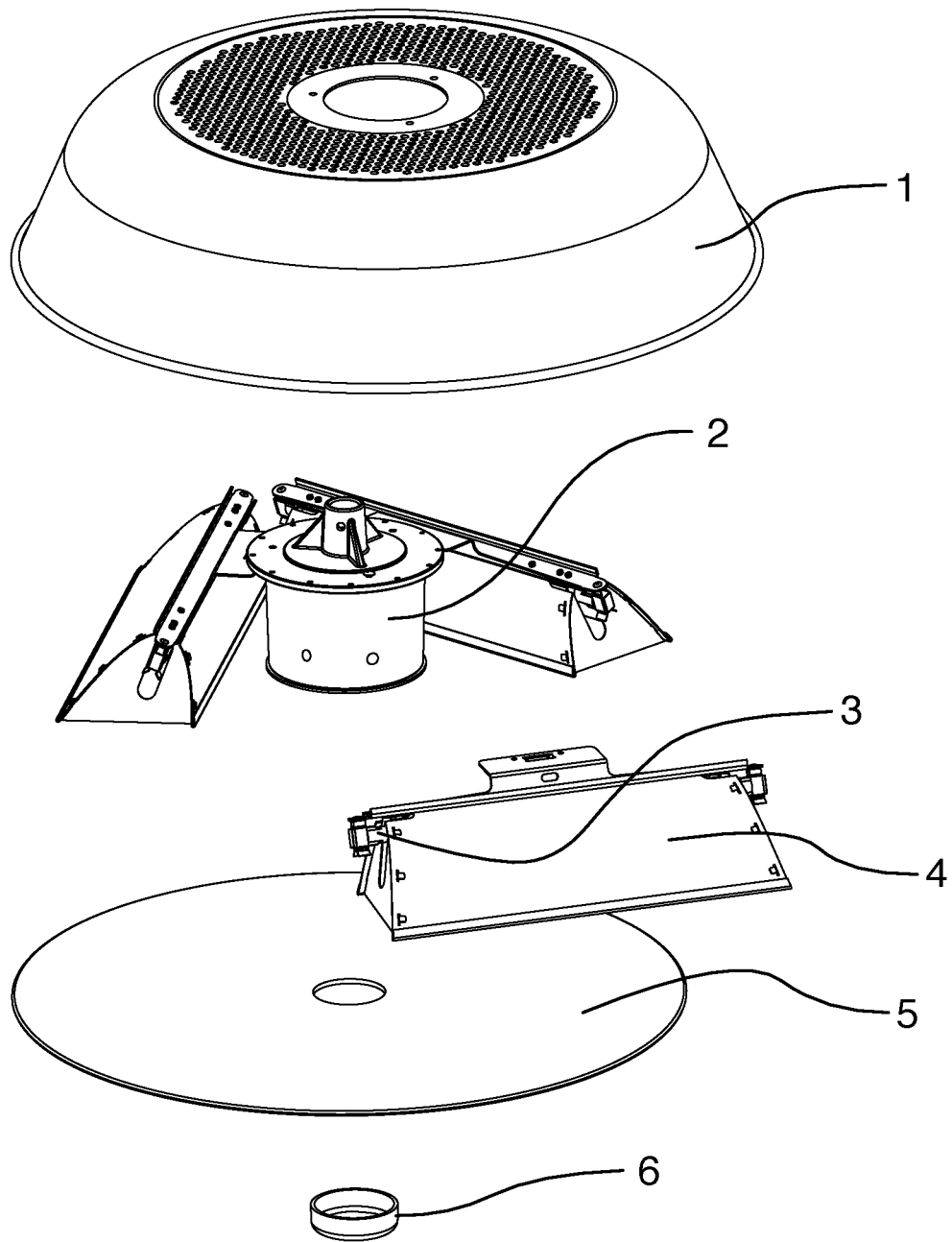
FIG. 17 is a schematic showing CFD parameters and conditions.
Figure 18:
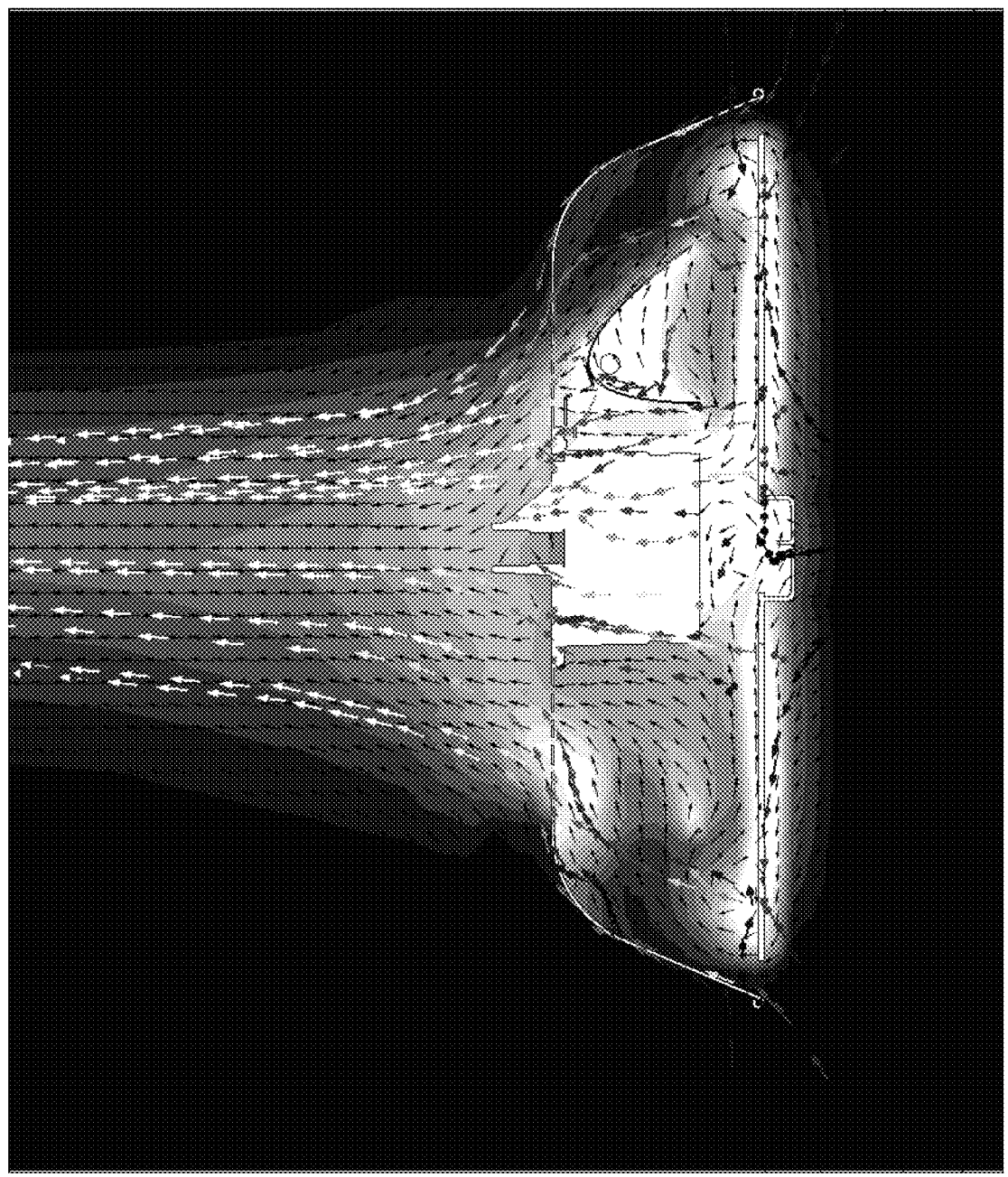
FIG. 18 is an image showing temperature and temperature of the model.
Figure 19:
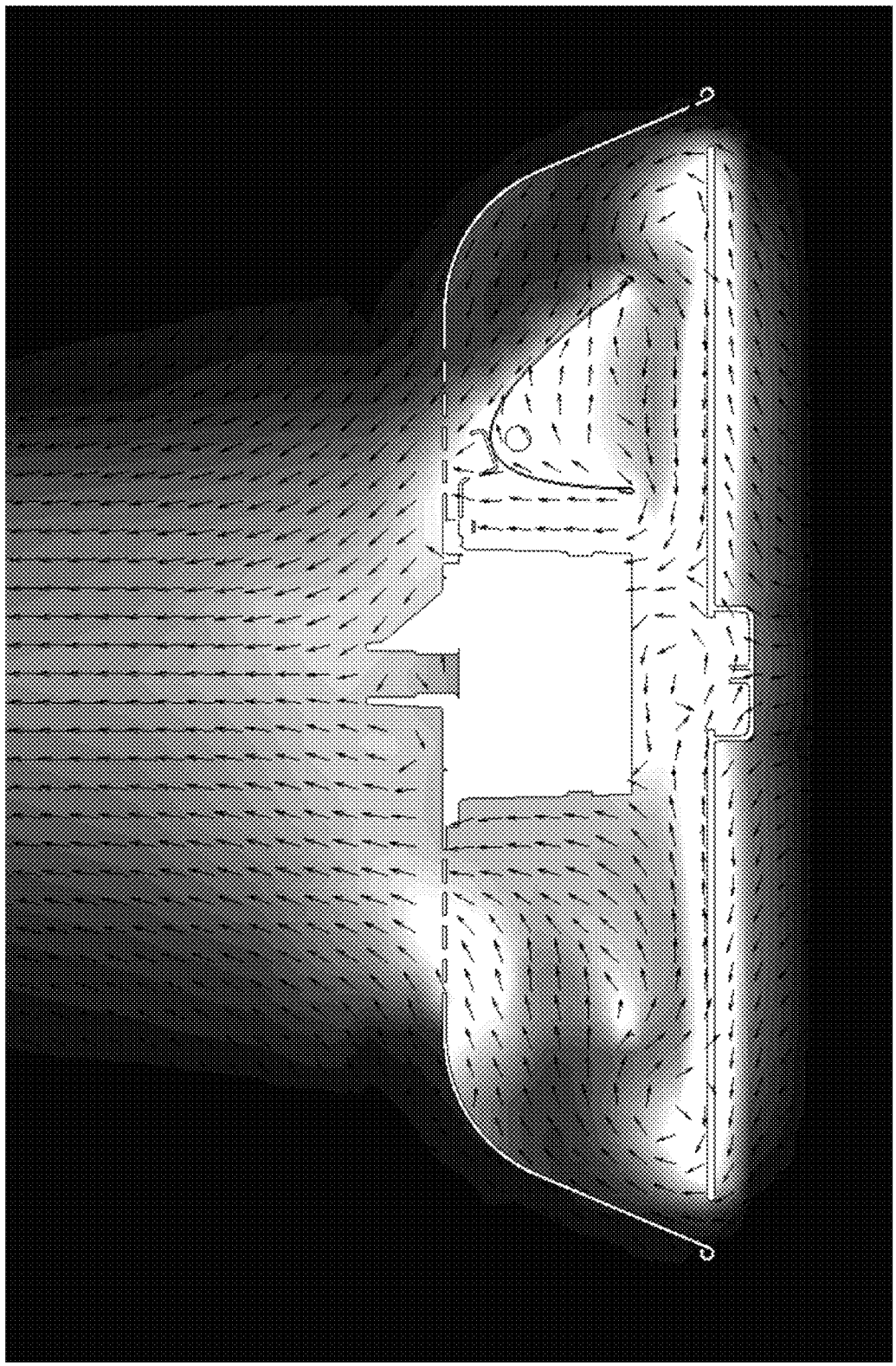
FIG. 19 is an enlarged view of FIG. 18.

CFD Analysis was carried out to better understand the manner of operation of the heater. The model used is shown in FIG. 15 and FIG. 16, the boundary conditions are detailed in FIG. 17 and the results are shown in FIG. 18 and FIG. 19.

The flow simulation indicated buoyancy driven flow. The flow simulation was based on calculation parameters including:
an external flow allowing heat conduction through solids
radiative heat transfer between surfaces by discrete transfer, run at ambient temperature of 25° C.
flow was defined as time dependent to allow flow dynamics to develop as internal component temperatures increase during computational simulation
gravity added in the Y direction of global average of 9.81 m/s$^2$
Project fluid defined as air at 25° C. with flow types being both laminar and turbulent
local convective heat transfer coefficients calculated by Reynolds number.
all surfaces default as non-radiating surfaces
surfaces participating in the calculation have specific emissivity's assigned based on known values for different surfaces
solver parameters adjusted for a physical time domain of 1800s representing twice as long as physical lab testing showed for flow to reach steady state temperatures and flow behavior
global mesh of 8 mm with local refinement 1-4 mm depending on component temperatures.

The image shows a cut plot of air temperature and flow trajectories of air velocity. The result image cut plot shows ambient temperature air flowing into inlet between the spun dish and heater glass disc. High temperature glass located close to the disc central axis pulls cool air across the top surface of the glass, subsequently pulling low temperature air in front of the emitters and between the ends of emitters where critical emitter temperatures exist. Turbulent flow circles around the emitters and the glass, removing heat from the system, then exits the perforated back of the heater at high speeds.

Whereas a specific embodiment is herein shown and described, variations are possible.

Figure 7:
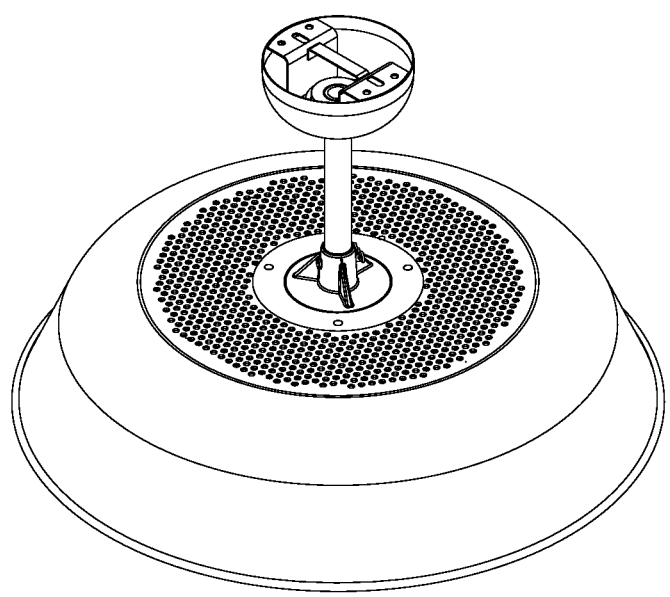
FIG. 7 is view similar to FIG. 1 of another example of the invention.
Figure 8:
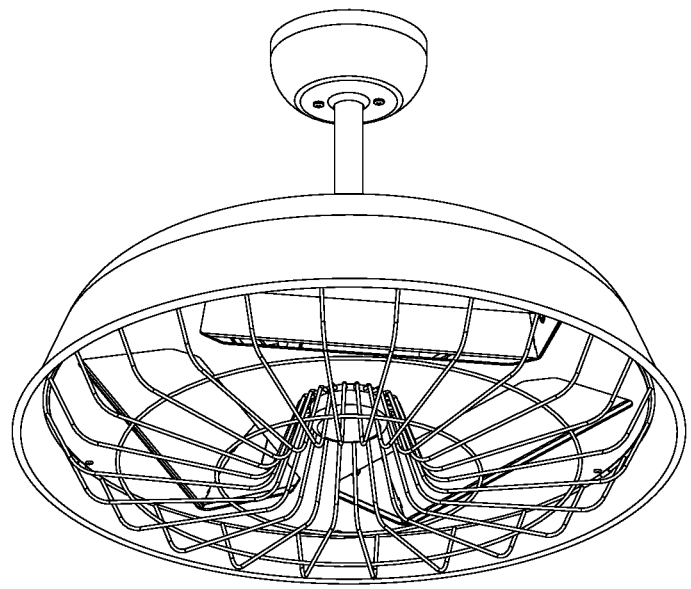
FIG. 8 is a view similar to FIG. 2 of another example of the invention.
Figure 9:
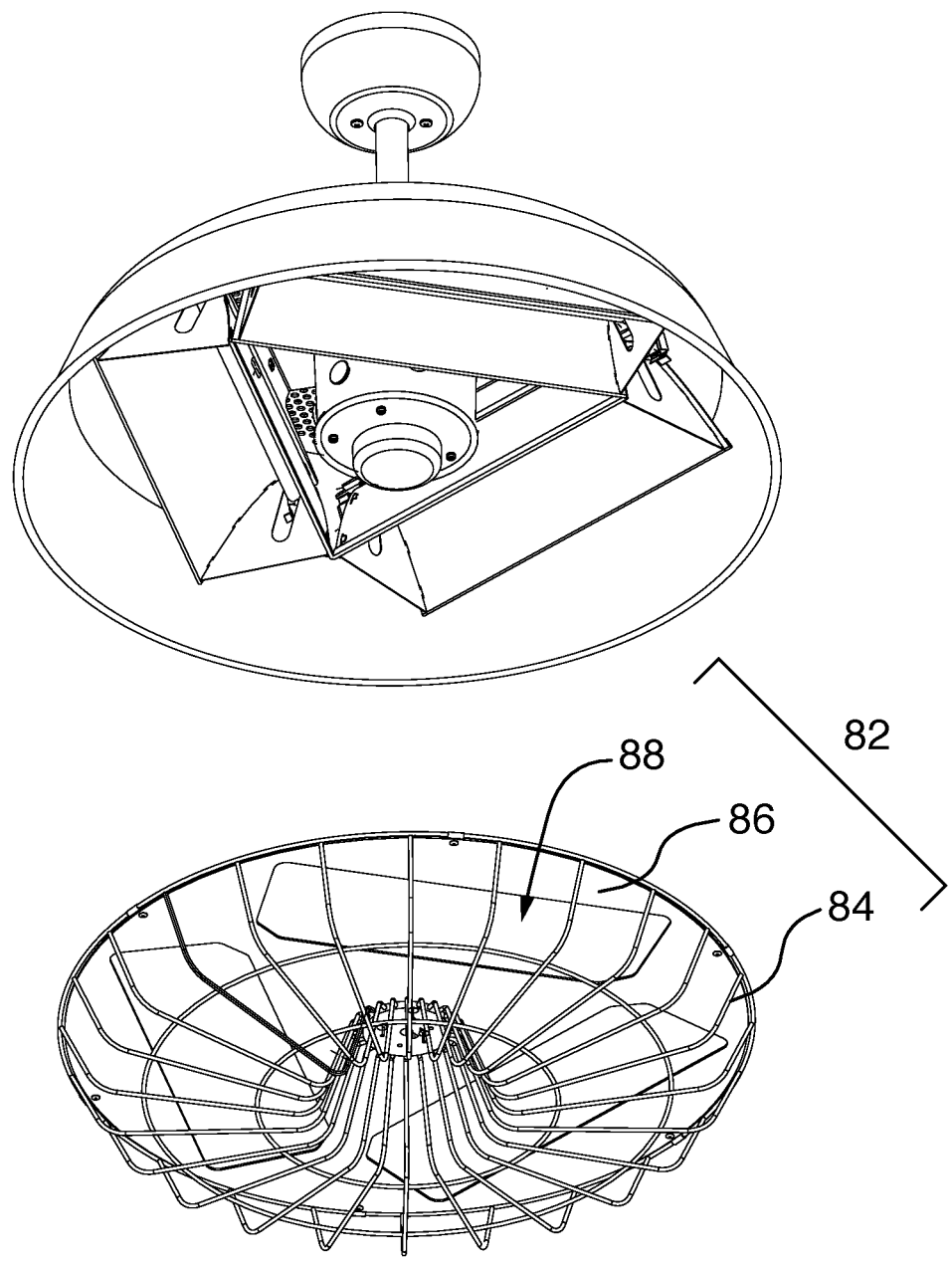
FIG. 9 is an exploded view of the lamp of FIG. 8.
Figure 10:
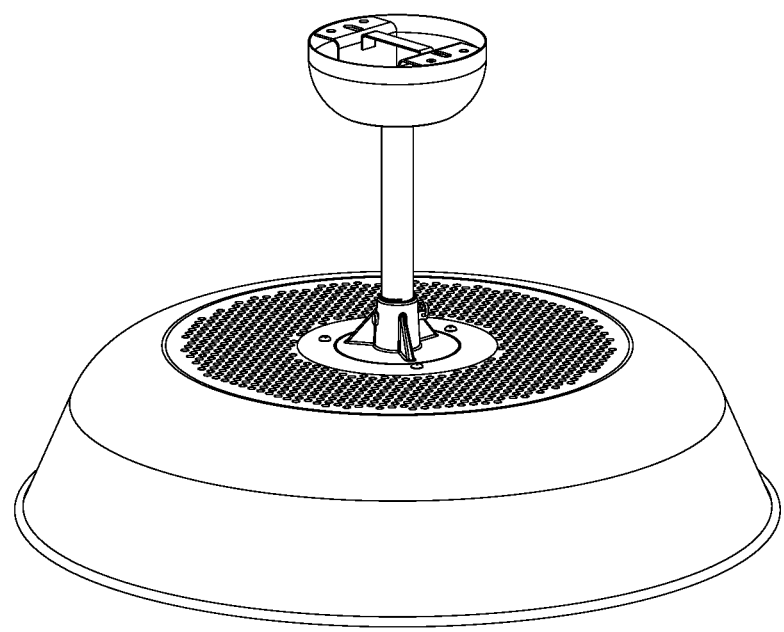
FIG. 10 is a view of the structure of FIG. 9 from another vantage point.
Figure 10:
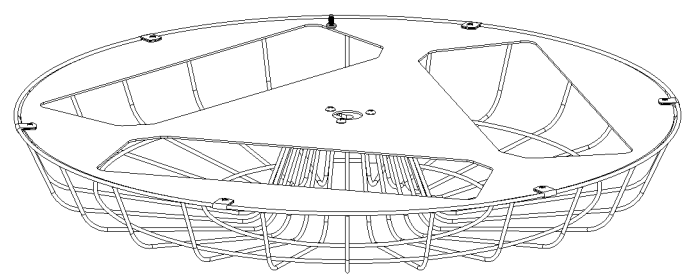
Figure 11:
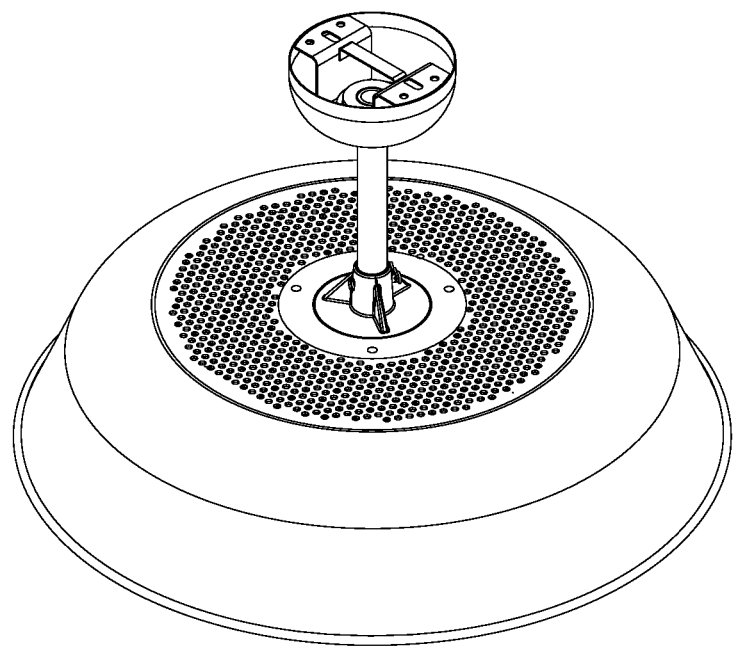
FIG. 11 is a view similar to FIG. 1 of another example of the invention.
Figure 12:
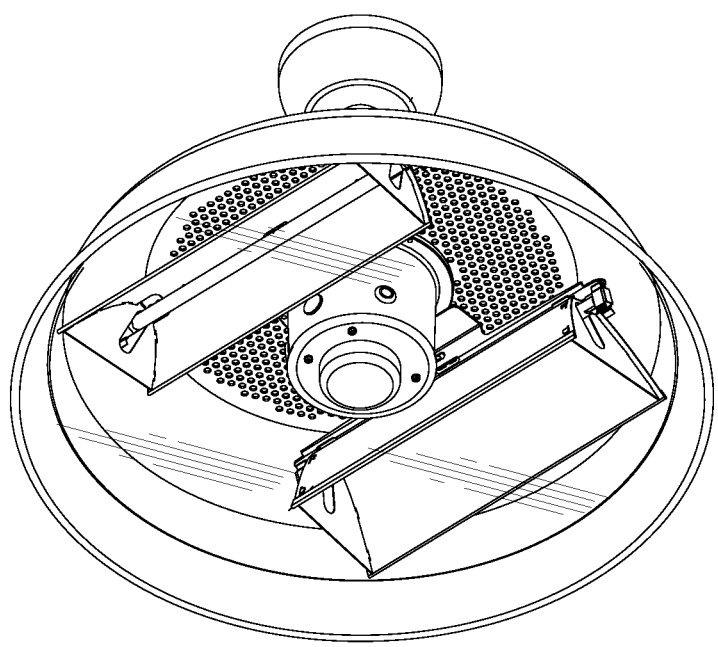
FIG. 12 is a view similar to FIG. 2 of the lamp of FIG. 11 invention.
Figure 13:
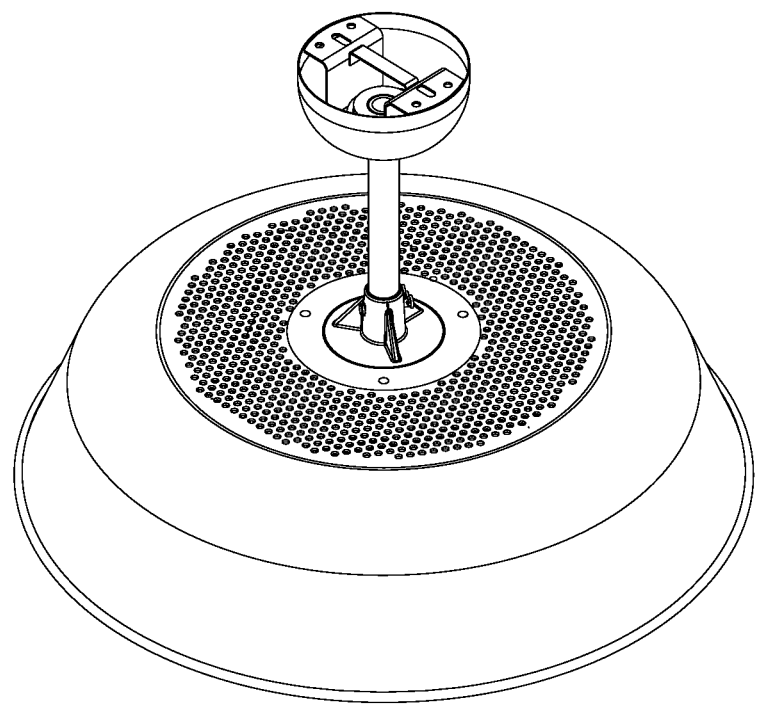
FIG. 13 is a view similar to FIG. 1 of another example of the invention.
Figure 14:
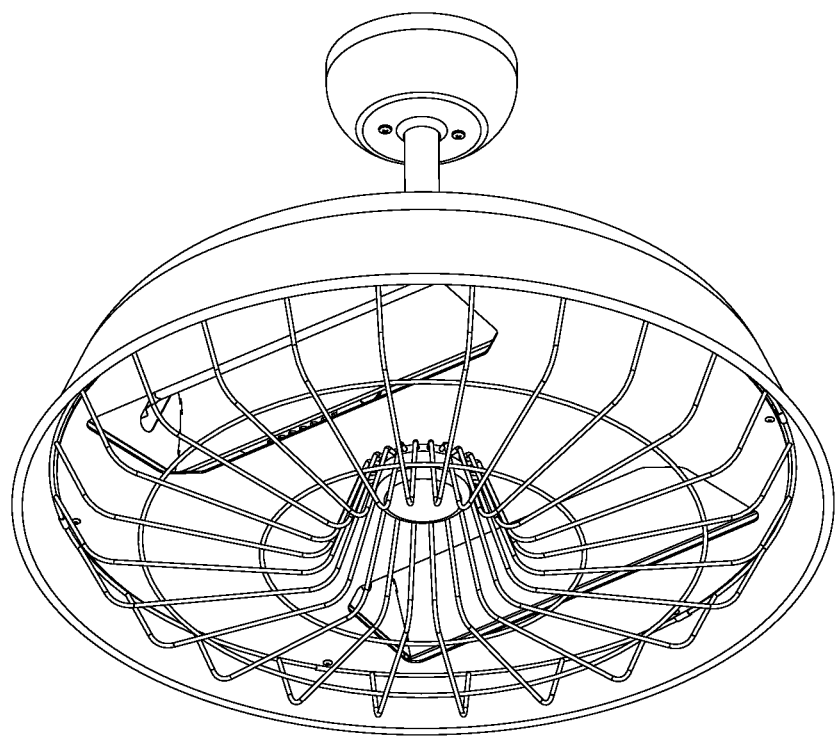
FIG. 14 is a bottom view of the lamp of FIG. 13.

For example, FIG. 7-9 show a variation wherein a cage assembly 82 takes the place of the disc assembly. The cage assembly includes a grate portion 84 and a backer portion 86, the backer portion having openings 88 which communicate the reflectors and otherwise functioning in a manner similar to the disc arrangement.

Further, lesser or greater numbers of emitters could be used, as shown in the two-emitter versions of FIGS. 11-14.

Emitters of differing size and power can also be used. In this regard, it has been found that the passive buoyancy driven cooling mechanism can be maintained through controlling heater power, glass and bowl diameter. For any heater between 3,000 and 12,000 watts, an air inlet diameter about roughly 40 mm larger than the glass diameter (20 mm over radius) has been found useful. [This relationship between heater power, glass diameter, inlet diameter will result in a constant ratio of air inlet area to glass diameter of 65 mm$^2$/mm diameter, or 2.5 in$^2$/in diameter.] Glass diameter can be defined by the calculation below:

$$\text{Glass Diameter} = 0.128 * \text{Heating Power} - 28 \text{ (Metric)}$$

Using combinations of commonly available 1500 and 2000 W emitters, the following heaters are useful:

TABLE 1

| Air inlet relationship, metric | | | | |
|---|---|---|---|---|
| Power (Watts) | Glass Diameter | Inlet Diameter (max) mm | Inlet Area (Max) mm^2 | Ratio, Inlet area to Glass diameter |
| 4500 | 548 | 588 | 35688 | 65 |
| 6000 | 740 | 780 | 47752 | 65 |
| 8000 | 996 | 1036 | 63837 | 64 |
| 10000 | 1252 | 1292 | 79922 | 64 |
| 12000 | 1508 | 1548 | 96007 | 64 |

In addition to differences in size and power, the heater can be modified through the use of curved emitters and reflectors. Carbon fiber emitters could also be used. Yet further modifications will be evident to persons of ordinary skill.

Accordingly, the invention should be understood to be limited only by the accompanying claims, purposively construed.

The invention claimed is:

1. A heater comprising:
    an emitter arrangement, the emitter arrangement being adapted to emit radiant energy;
    a disc adapted to permit throughpassage of radiant energy, the disc being flat and free from protrusions and defining a round outer edge, the disc being disposed beneath the emitter arrangement;
    a body shaped in the manner of an inverted-bowl, the body having a top portion and defining a circular rim at a lower extent of the body, the body being disposed around the emitter arrangement and around the disc, the rim being adjacent the round outer edge of the disc, such that the emitter arrangement is between the top portion of the body and the disc;
    wherein the body is annular and has a central axis;
    the disc is orientated perpendicular to the central axis;
    the body has a top portion that is orientated perpendicular to the central axis; and
    the emitter arrangement is disposed in surrounding relation to the central axis and in a planar arrangement that is perpendicular to the central axis; and
    wherein the emitter arrangement is defined by a plurality of linear emitters; and
    for each emitter, a parabolic reflector.

2. A heater according to claim 1, wherein a plurality of vents are disposed in the top portion of the body.

3. A heater according to claim 1, wherein the plurality of emitters is defined by three emitters.

4. A heater according to claim 1, further comprising a heat resistant tubular core from which the disc is suspended and which extends therefrom to the cover.

* * * * *